United States Patent Office 3,776,814
Patented Dec. 4, 1973

---

3,776,814
HIGH TEMPERATURE NUCLEAR REACTORS
George Edward Lockett, Poole, and Samuel Brittan Hosegood, Wareham, England, assignors to United Kingdom Atomic Energy Authority, London, England
Filed Feb. 18, 1971, Ser. No. 116,448
Claims priority, application Great Britain, Mar. 2, 1970, 9,975/70
Int. Cl. G21c *13/08*
U.S. Cl. 176—87    10 Claims

ABSTRACT OF THE DISCLOSURE

The difficulties which arise, in conducting heat away from the thermal shield, which lies between a nuclear reactor core and the concrete pressure vessel which contains it, are acute, especially in respect of the underside of the core, and in cases where the direction of coolant flow is vertically downwards. According to the present invention this difficulty is overcome by using thermal conduction to lead away heat from the thermal shield to the concrete vessel in which the usual liquid coolant pipes are embedded. Special measures are taken to ensure a good conductive flow-path which are effective enough to obviate the need of special bleed coolant flows.

BACKGROUND OF THE INVENTION

This invention relates to high temperature gas cooled nuclear reactors and chiefly concerns arrangements for cooling the thermal neutron shield. As will be known, gas-cooled reactors are housed in pressure vessels which need to be shielded from the effects of thermal neutrons emanating from the reactor core and a suitable material for this purpose is steel. Where the reactor is designed to pass outlet gas at a very high temperature for use for example directly as working fluid in a gas turbine, the gas temperature in the outlet gas plenum of the pressure vessel may be as high as 950° C. It then becomes necessary to provide a cooling system for the thermal shield. Now it is a common solution to many cooling problems in gas cooled reactors to take a bleed of low temperature coolant gas and direct it on to the part that is to be cooled but this necessarily adds to the duty of the cooling system and complicates the design of the pressure vessel internals. Moreover with the high temperatures mentioned it may be expedient to use ceramics or graphite in the core support structure which obviates the need for cooling, an advantage which would be negative to some extent if a bleed of coolant were still required to cool the thermal shield.

SUMMARY OF THE INVENTION

According to invention the thermal shield in a nuclear reactor pressure vessel is maintained at a satisfactory working temperature by giving up its heat by conduction to the lining of the pressure vessel. As will be known the lining of the pressure vessel is usually cooled by water passed through pipes attached to the outside surface of the lining and embedded in the concrete and in this way the thermal shield temperature is kept low.

DESCRIPTION OF THE DRAWING

In order that the invention may be more readily understood, one embodiment thereof will now be described with reference to the accompaying drawing in which.

DESCRIPTION OF THE PREFERRED EMBODIMENTS

Figure 1:
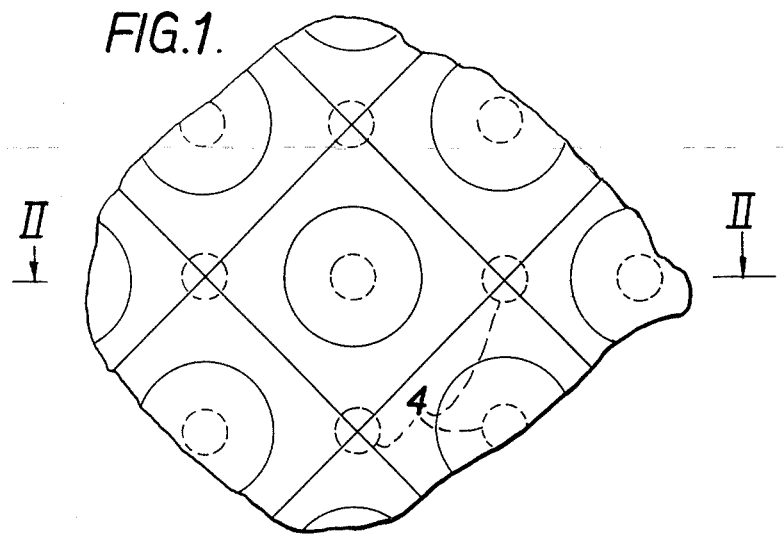
FIG. 1 is a view in plan of part of the thermal shield shielding the underlying floor of the interior of a pre-stressed concrete pressure vessel.
Figure 2:
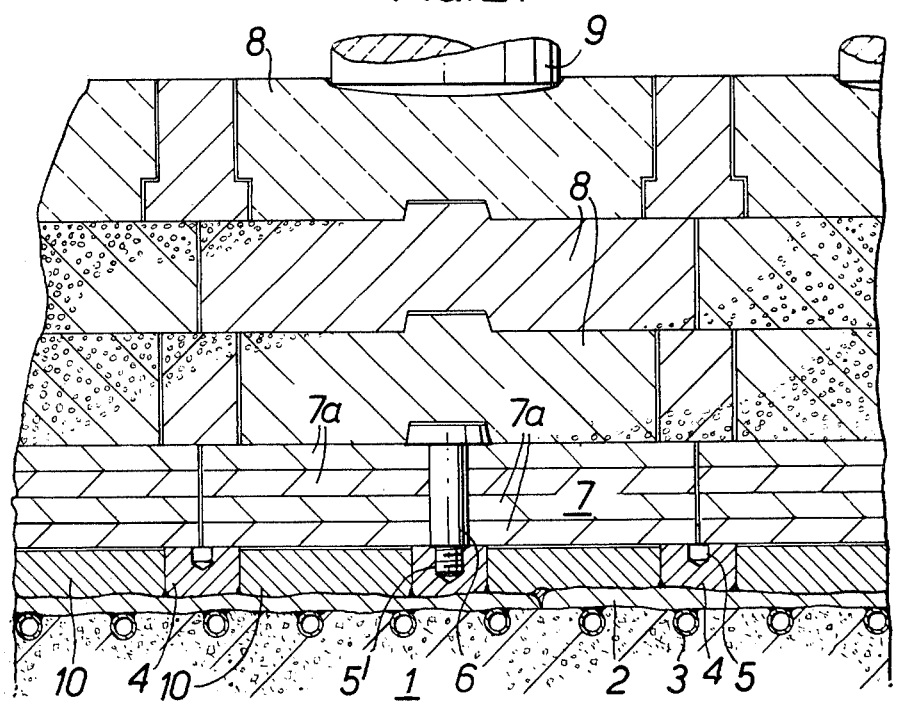
FIG. 2 is a cross sectional view of the line II—II of FIG. 1 drawn on a larger scale.

Referring to the drawings there is shown at 1 a part of the floor bounding the interior of a pre-stressed concrete pressure vessel. The floor 1 in common with other internal surfaces of the vessel interior is lined with a steel lining 2 and this is cooled by means of water pumped through cooling tubes 3 embedded in the floor concrete. To provide a level surface and structure for supporting the thermal shield and above it the core support structure, a number of steel supports 4 are welded to the liner at spaced apart positions over the floor on a square lattice pitch as shown in FIG. 1. The upper surfaces of these supports are machined in situ to a common level, and to facilitate this each end face has a blind hole 5 to take the centre of the cutting or grinding tool used for this purpose. Alternate columns 4 have somewhat larger holes 5' which are internally threaded to receive bolts 6. The bolts 6 locate the thermal shield 7 which is of laminated structure, comprising a number of stacks of steel plates 7a arranged side by side. As shown each stack of plates is anchored at its centre by one of the bolts 6 and bears at its four corners on four adjacent columns 4.

On top of the uppermost plates of the thermal shield are stacked layers of bricks 8 which heat insulate the thermal shield from the high temperature environment of the core and hot coolant which sweeps the upper surface of the top layer of the blocks. It is preferred to build the lower layers with blocks formed of foamed silicon nitride or other suitable material which has good insulating properties and is chemically inert whilst the upper layer is of graphite to withstand direct contact with the hot reactor coolant as it issues from the core. It is the upper layer of graphite blocks which locates the bases of a number of graphite columns 9 at positions coaxial with those of the columns 4 which carry bolts 6 and these columns 9 support the core itself.

The thermal shield is thus heat insulated from the core and hot gas to a high degree but not completely. It is further heated by the absorption of thermal neutrons emanating from the core. To dissipate the heat from these sources by conduction to the lining, the spaces between the lining and the undersides of the lowermost plates 7a are filled, or substantially filled, with a suitable heat conducting material whose underside is arranged to conform substantially to the inevitable irregularities in the upper surface of the liner, so as to provide good thermal contact. Such filling can conveniently be provided in the form of metal slabs 10 (preferably of lead), precast to conform to the spaces in which they are installed.

Because the lower contour of these spaces is irregular, bounded by the lining, the lead may fill the spaces as in situ cast slabs by pouring molten lead in the spaces. Alternatively, the spaces may be filled with lead shot before the thermal shield is assembled and this material may be pounded down, if desired, by a ram to get good surface contact between the shot.

Any other suitable method of getting the heat from the thermal shield to the water cooled liner by conduction may be employed.

In cases where the heat flux to be conducted to the lining is not too great, an alternative and simplified method of construction can be employed. In such cases the steel supports 4 can be made of sufficient height to provide space for a thermal shield of metal shot (iron or steel shot) resting directly on the upper surface of the lining 2. All except one of the steel plates 7a could then be omitted, a single steel plate being retained to transmit the load from the insulating blocks 8 to the steel supports 4.

The foregoing description relates to a thermal shield for the floor of the vessel and is not directly applicable to the shielding of vertical walls or roofs. Modified forms of construction and/or materials would have to be employed for such applications.

We claim:

1. A nuclear reactor pressure vessel defining a space for containing a nuclear reactor core, a thermal neutron shield disposed within the vessel and in heat-conducting relationship with the wall thereof, thermal insulation between the thermal neutron shield and said space, and means for removing heat transferred by conduction from the thermal neutron shield to said pressure vessel.

2. A pressure vessel as claimed in claim 1, wherein the pressure vessel is made of pre-stressed concrete.

3. A pressure vessel as claimed in claim 1 wherein a reactor core is disposed in said space and wherein core support means are provided for transferring the weight of the core to the pressure vessel by way of said thermal neutron shield.

4. A pressure vessel as claimed in claim 3 wherein said core support means comprise a plurality of upstanding core support members disposed within the bottom region of the pressure vessel in interspaced relationship, the upstanding extremities of the core support members having a common level.

5. A pressure vessel as claimed in claim 3 wherein said extremities of the core support members are adapted to receive the centre of a metal machining tool.

6. A pressure vessel as claimed in claim 3 wherein said core support members are adapted to locate the thermal neutron shield.

7. A pressure vessel as claimed in claim 1 wherein the pressure vessel is made of pre-stressed concrete and heat conductive material is disposed between the thermal neutron shield and the adjacent portion of the pressure vessel wall.

8. A pressure vessel as claimed in claim 7 wherein the heat conductive material comprises a steel lining adjacent the pressure vessel wall and metal cast in situ between the lining and the thermal neutron shield.

9. A pressure vessel as claimed in claim 1 wherein the thermal insulation comprises silicon nitride.

10. A pressure vessel as claimed in claim 1 wherein the thermal neutron shield is disposed in the bottom region of the pressure vessel, a reactor core is disposed in said space and support members are provided for transferring the weight of the reactor core to said pressure vessel by way of said thermal insulation and said thermal neutron shield.

References Cited

UNITED STATES PATENTS

| | | | |
|---|---|---|---|
| 3,489,206 | 1/1970 | Lecourt | 176—87 X |
| 3,424,239 | 1/1969 | Coudray | 176—87 |
| 3,159,550 | 12/1964 | Laming | 176—87 |
| 3,544,425 | 12/1970 | Shaw et al. | 176—87 X |

FOREIGN PATENTS

| | | | |
|---|---|---|---|
| 1,408,372 | 7/1965 | France | 176—87 |

REUBEN EPSTEIN, Primary Examiner

U.S. Cl. X.R.

165—136